C. H. JOHNSTONE.
SPRING WHEEL.
APPLICATION FILED AUG. 23, 1911.

1,045,559.

Patented Nov. 26, 1912.

WITNESSES
Oliver W. Holmes
Clara Everett

INVENTOR
C. H. Johnstone
By J. M. Lee
Attorney

UNITED STATES PATENT OFFICE.

CHARLES HECTOR JOHNSTONE, OF ARMSTRONG, BRITISH COLUMBIA, CANADA.

SPRING-WHEEL.

1,045,559.

Specification of Letters Patent. Patented Nov. 26, 1912.

Application filed August 23, 1911. Serial No. 645,500.

*To all whom it may concern:*

Be it known that I, CHARLES HECTOR JOHNSTONE, a subject of the King of England, residing at Armstrong, in the county of Yale and Province of British Columbia, in the Dominion of Canada, have invented certain new and useful Improvements in Spring-Wheels, of which the following is a specification.

The present invention relates to certain new and useful improvements in spring wheels, and has for its object to provide a device of this character which is comparatively simple and inexpensive in its construction, which comprises few and durable parts, and which possesses all the resiliency of a pneumatic tire.

A further object of the invention is to provide a spring wheel in which the cushioning element is located adjacent the hub of the wheel so as to be shielded from all wear and tear, which can be readily assembled or taken apart, and which is not awkward or cumbersome in appearance.

With these and other objects in view as will more fully appear as the description proceeds, the invention consists in certain combinations and arrangements of the parts, the novel features thereof being pointed out in the appended claims.

Figure 1:
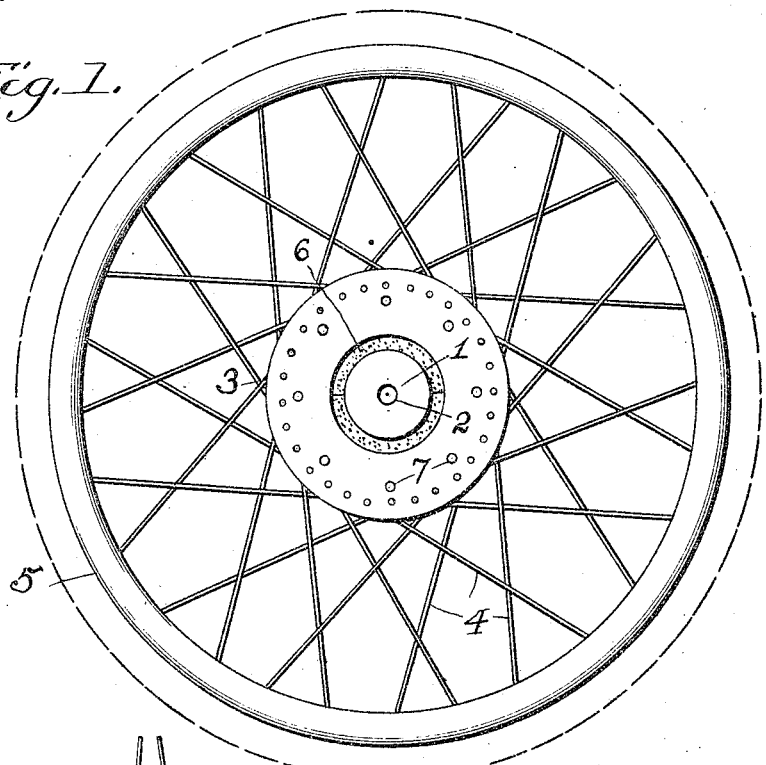
Figure 2:
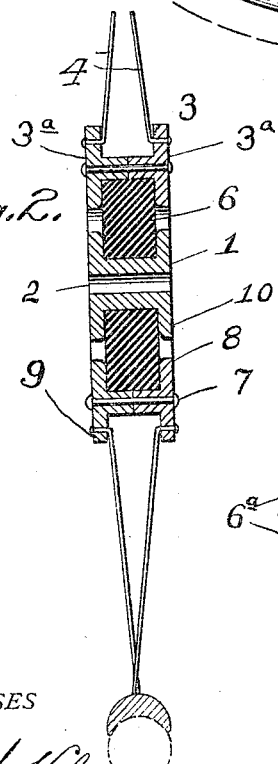
Figure 3:
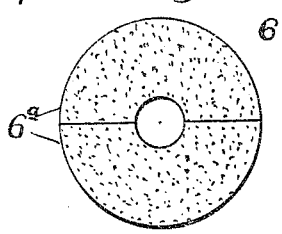

For a full understanding of the invention, reference is to be had to the following description and accompanying drawings, in which:

Figure 1 is a side elevation of a spring wheel constructed in accordance with the invention; Fig. 2 is a transverse sectional view through the spring wheel, portions being broken away; Fig. 3 is a detail view of the cushioning element.

Corresponding and like parts are referred to in the following description and indicated in all the views of the drawings by like reference characters.

Specifically describing the preferred embodiment of the invention, the numeral 1 designates the hub of the wheel which is provided with the usual opening 2 for the reception of the axle. A ring 3 surrounds the hub 1 and is spaced therefrom, the said ring being connected by spokes 4 to the rim 5. A solid rubber collar 6 is interposed between the hub 1 and the ring 3 and serves as a cushioning element to absorb all shocks and jars and prevent the same from being transmitted to the axle. The rim 5 may be provided with a solid tire, since the resilient collar 6 is designed to perform all the functions of a pneumatic tire.

In the drawing, the ring 3 is formed in complemental sections $3^a$ which are fitted together from opposite sides of the wheel and connected by suitable fastening members 7. These sections $3^a$ are substantially T-shaped in cross section, each of them being provided with an annular flange 8 which engages the resilient collar 6 and also with an outwardly extending annular flange 9 to which the inner ends of the spokes 4 are attached. It will also be observed that the ends of the hub 1 are formed with the annular flanges 10 which project outwardly upon opposite sides of the cushioning collar 6 and coöperate with the flanges 8 to hold the said cushioning collar in position. This cushioning collar, as shown more clearly in Fig. 3 comprises the two complemental sections $6^a$ which are adapted to be applied to the hub 1 from opposite sides thereof. After the cushioning collar has been placed in position, the sections $3^a$ of the ring 3 may be fitted together from opposite sides of the wheel so that the flanges 8 thereof engage the collar 6. In a reverse manner the wheel can be taken apart, and it will be observed that the collar 6 does not come into contact with the surface of the road and will wear indefinitely.

Having thus described the invention, what is claimed as new and desired to be secured by Letters Patent is:

A wheel of the character described comprising a hub having the opposite ends thereof provided with outwardly projecting annular flanges, a solid resilient collar formed in segmental sections and adapted to be fitted around the hub between said annular flanges, rings surrounding each of said annular flanges and being spaced therefrom, said rings being provided at an intermediate point with inwardly projecting annular flanges adapted to inclose the outer periphery of said collar and hold the same in position, fastening members connecting the said rings, a rim, and spokes between the rim and the rings.

In testimony whereof I affix my signature in presence of two witnesses.

CHARLES HECTOR JOHNSTONE.

Witnesses:
S. B. VAN KHECK,
J. M. WRIGHT.

Copies of this patent may be obtained for five cents each, by addressing the "Commissioner of Patents, Washington, D. C."